(12) United States Patent
Gehlot et al.

(10) Patent No.: US 6,641,038 B2
(45) Date of Patent: Nov. 4, 2003

(54) SMART VEHICLE REGISTRATION PLATE

(75) Inventors: Narayan Gehlot, Sayreville, NJ (US); Victor Lawrence, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 137 days.

(21) Appl. No.: 09/891,633

(22) Filed: Jun. 25, 2001

(65) Prior Publication Data

US 2002/0195490 A1 Dec. 26, 2002

(51) Int. Cl.[7] .............................................. G07B 15/02
(52) U.S. Cl. .................... 235/384; 340/426; 340/933; 342/44; 40/200
(58) Field of Search ........................ 235/384; 340/426, 340/933; 342/44; 90/200

(56) References Cited

U.S. PATENT DOCUMENTS 6,239,757 B1 * 5/2001 Ishikawa et al. ............ 343/711

* cited by examiner

Primary Examiner—Thien M. Le
Assistant Examiner—Daniel A. Hess

(57) ABSTRACT

A smart vehicle registration plate for a vehicle have a computing unit configured to process vehicle related information, and a display, the display having one or more information display regions, for displaying the vehicle related information. The information display regions may be updateable by the computing unit as a function of changes to the vehicle related information.

27 Claims, 5 Drawing Sheets

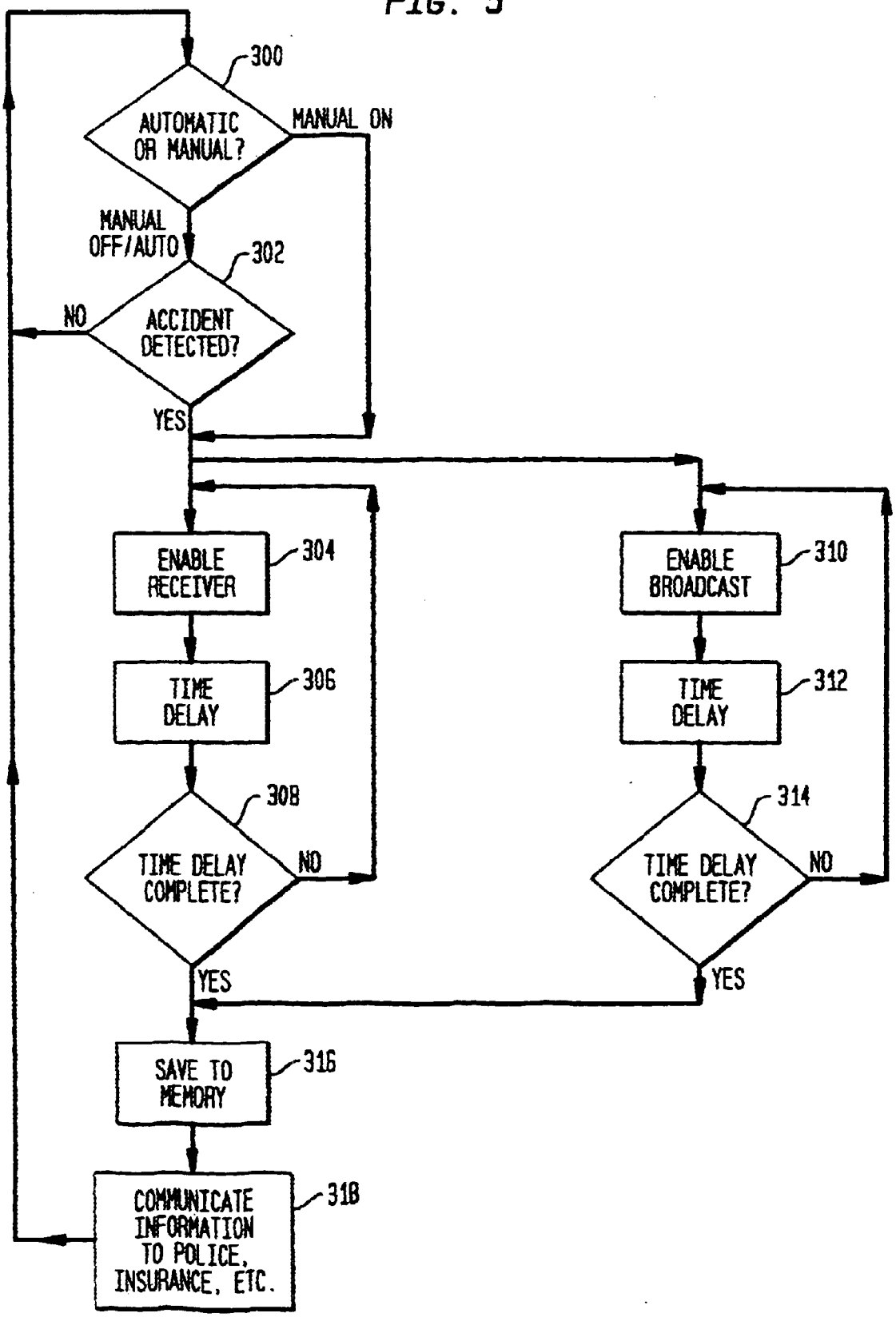

SMART VEHICLE REGISTRATION PLATE

FIELD OF THE INVENTION

The present invention relates to vehicle license plates, and, more particularly, to a Smart Vehicle Registration Plate capable of dynamically updating and displaying information.

BACKGROUND OF THE INVENTION

It is customary for vehicles traveling in the United States and in other countries to have a vehicle registration plate, or license plate. This vehicle registration plate is normally positioned at the rear and often also at the front of the vehicle, usually near the bumpers of the vehicle. The registration plate provides information such as the registration number of the vehicle as well as the state to which the vehicle is registered.

Under many circumstances, it is important for persons to be able to view information located on the registration plate. For example, it is often important for the vehicle registration plate to be viewed by police, who need to know pertinent information about a vehicle when pulling the vehicle to the side of the road for a violation of the traffic laws or for other reasons. Also, during an accident, such as, for example, a hit-and-run, other motorists may need to be able to view the information on the registration plate. Further, if the vehicle is abandoned, a visible vehicle registration plate allows the proper authorities to quickly identify the vehicle.

Many vehicle registration plates are made of metal, sometimes with stamped or raised letters, which are usually also painted on. Since viewing the registration number and state information on these vehicle registration plates is often difficult, especially during evening hours, special light colored or reflective paints have been used in order to enhance visibility of these registration plates. Additionally, many vehicles are manufactured with lights especially designed to illuminate the registration plate.

These methods of enhancing visibility of the registration plates, however, often still result in a vehicle registration plate that is difficult for a police officer or other persons to read and comprehend.

Further, while the registration number and state of registration are often displayed on the registration plate, outside observers as well as the driver of the vehicle may benefit from the displaying of other pertinent information relating to the vehicle and to the driver of the vehicle.

With regard to this additional helpful information, much of this additional information is dynamic in nature and changes as the driver and vehicle pass into different regions and areas, or undergo other changes in circumstances such as the vehicle becoming involved in an accident, or being rendered disabled, or the driver experiencing a medical emergency.

These types of dynamically changing information can not be displayed by conventional registration plates, which, due to their nature, do not facilitate the updating of information, but only display static, unchanging information.

SUMMARY OF THE INVENTION

In an exemplary embodiment, the present invention is directed to a Smart Vehicle Registration Plate for a vehicle. The Smart Vehicle Registration Plate may have a computing unit configured to process vehicle related information, and a front surface having a display, the display having one or more information display regions, for displaying the processed vehicle related information external to the vehicle. The information display regions are controlled by and may be updated by the computing unit as a function of changes to the vehicle related information.

The Smart Vehicle Registration Plate may take the form of a registration or license plate, and may be positioned on a vehicle as would a standard registration plate or license plate, although other positions may be used. Information normally displayed on a vehicle registration plate, as well as additional vehicle related information, may be displayed by the Smart Vehicle Registration Plate. Further, the vehicle related information displayed by the Smart Vehicle Registration Plate may be changed or updated as pertinent vehicle related information changes. Additionally, the Smart Vehicle Registration Plate may also communicate and exchange data with other Smart Vehicle Registration Plates or outside entities such as the Department of Motor Vehicles, police, or emergency workers, and the like. Some non-limiting examples of displayed vehicle related information may be a vehicle registration number; an expiration date; a state identifier; an emergency message; a personal message region; a country identifier; a county identifier; last accident/violation region; and the driver's experience driving in a particular geographic area.

BRIEF DESCRIPTION OF THE DRAWINGS

In the drawing figures, which are not to scale, and which are merely illustrative, and wherein like reference characters denote similar elements throughout the several views:

FIG. 5 is an exemplary flow diagram depicting receiving and transmitting operations of the present invention.

DETAILED DESCRIPTION OF THE INVENTION

Figure 1:
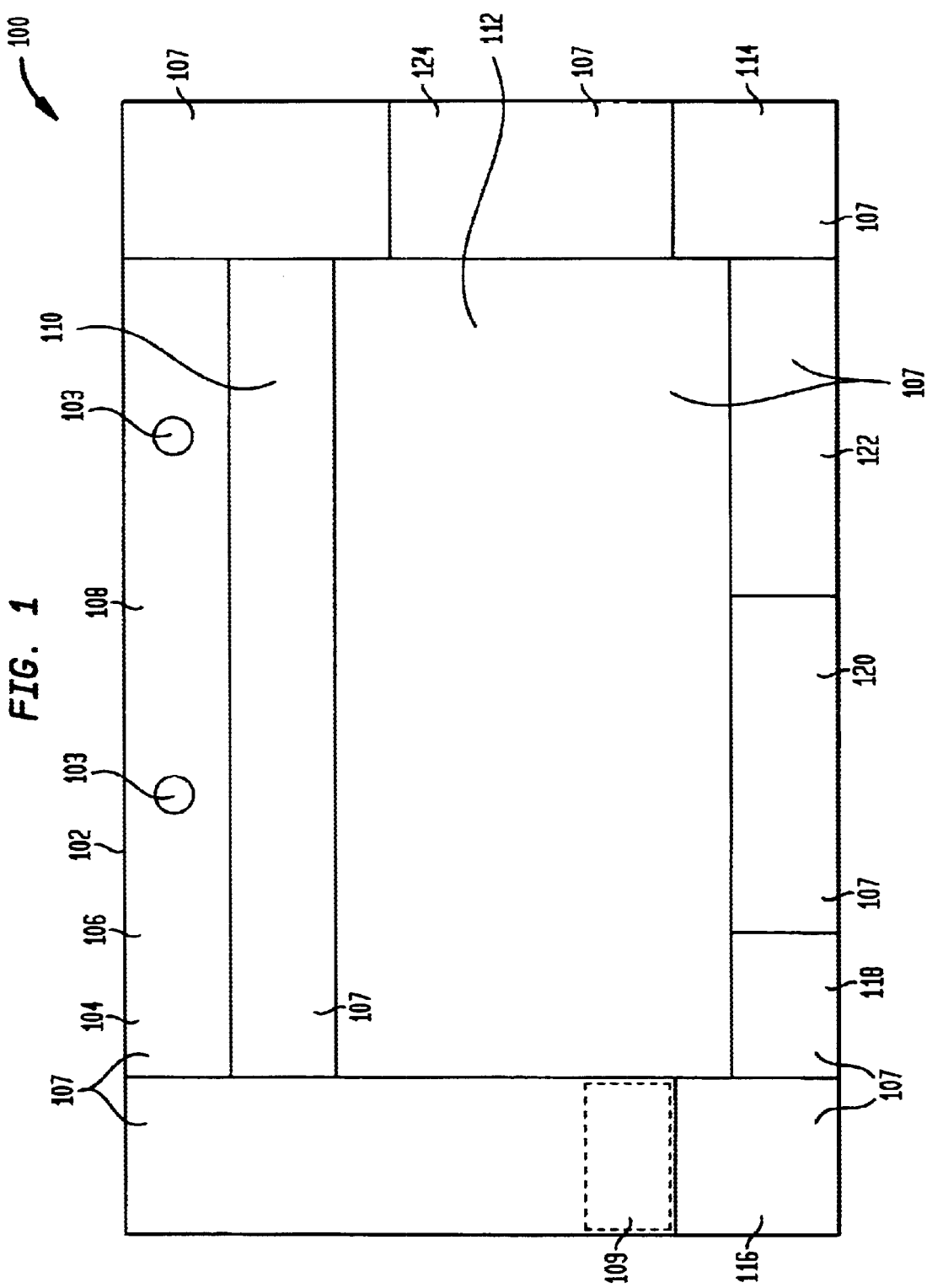
FIG. 1 is a schematic view of an embodiment of a Smart Vehicle Registration Plate, constructed in accordance with the present invention.

Referring to FIG. 1, there is shown a Smart Vehicle Registration Plate 100. Smart Vehicle Registration Plate 100 may have a housing 102 having a front surface 106. The display 104 may be disposed on front surface 106. Display 104 may include one or more information display regions 107. In an exemplary embodiment, display 104 may be a high resolution graphical display unit, such as, by non-limiting example, a high resolution Light Emitting Diode (LED), Liquid Crystal Display (LCD), or plasma display. In an exemplary embodiment, display 104 may have the ability to show alphanumeric characters so that they may be viewed and easily discerned by other motorists or pedestrians situated near the vehicle. In an exemplary embodiment, display 104 may be illuminated in order to facilitate easy viewing during night or otherwise dark viewing environment. The illumination may be provided by back lighting, use of light emitting diodes, or other known display illumination techniques.

In an exemplary embodiment, housing 102 of Smart Vehicle Registration Plate 100 is formed in a thin rectangular shape, similar to that of a commonly used vehicle registration plate. Housing 102 may be formed with mounting holes 103 to facilitate attachment of the Smart Vehicle Registration Plate to a vehicle (not shown). In an exemplary embodiment, mounting holes 103 on housing 102 are disposed such that they may received mounting screws (not shown) and be mounted in a similar fashion and at a similar location to standard vehicle registration plates. Alternatively, housing 102 may be secured to a vehicle by other affixing means such as clamps, bolts, adhesives, welding, or other appropriate means. In another embodiment, housing 102 may be formed integrally with the body of a vehicle. In this embodiment, unwanted removal of housing 102 from the vehicle is limited. If, for example, the vehicle is stolen, a message indicating the vehicle's stolen status may be displayed, and a thief would not be able to easily remove the Smart Vehicle Registration Plate 100 from the vehicle, thus facilitating a rapid identification and recovery of the stolen vehicle. Further, in this embodiment, a sleek aesthetic design may be achieved wherein housing 102 physically and aesthetically blends into the design motif of the vehicle. Ultimately, the size, shape, placement and design of the Smart Vehicle Registration Plate 100 is a matter of application specific design choice.

In an exemplary embodiment, information display regions 107 may be disposed on different portions of display 104, such that various types of information may be independently displayed and dynamically modified on Smart Vehicle Registration Plate 100. In an exemplary embodiment, information display regions 107 are capable of displaying alphanumeric information in a variety of fonts and a variety of colors and of displaying the alphanumeric characters against a variety of colored backgrounds in order to provide enhanced contrast and readability of the displayed information.

Information display regions 107 may include, but are not limited to, an "emergency message" region; a "registration number" region; an "expiration date" region; a "last accident/violation" region; a "country identifier" region; a "state identifier" region; a "county identifier" region; a "personal message" region; and an "experience in the area" region.

Figure 2:
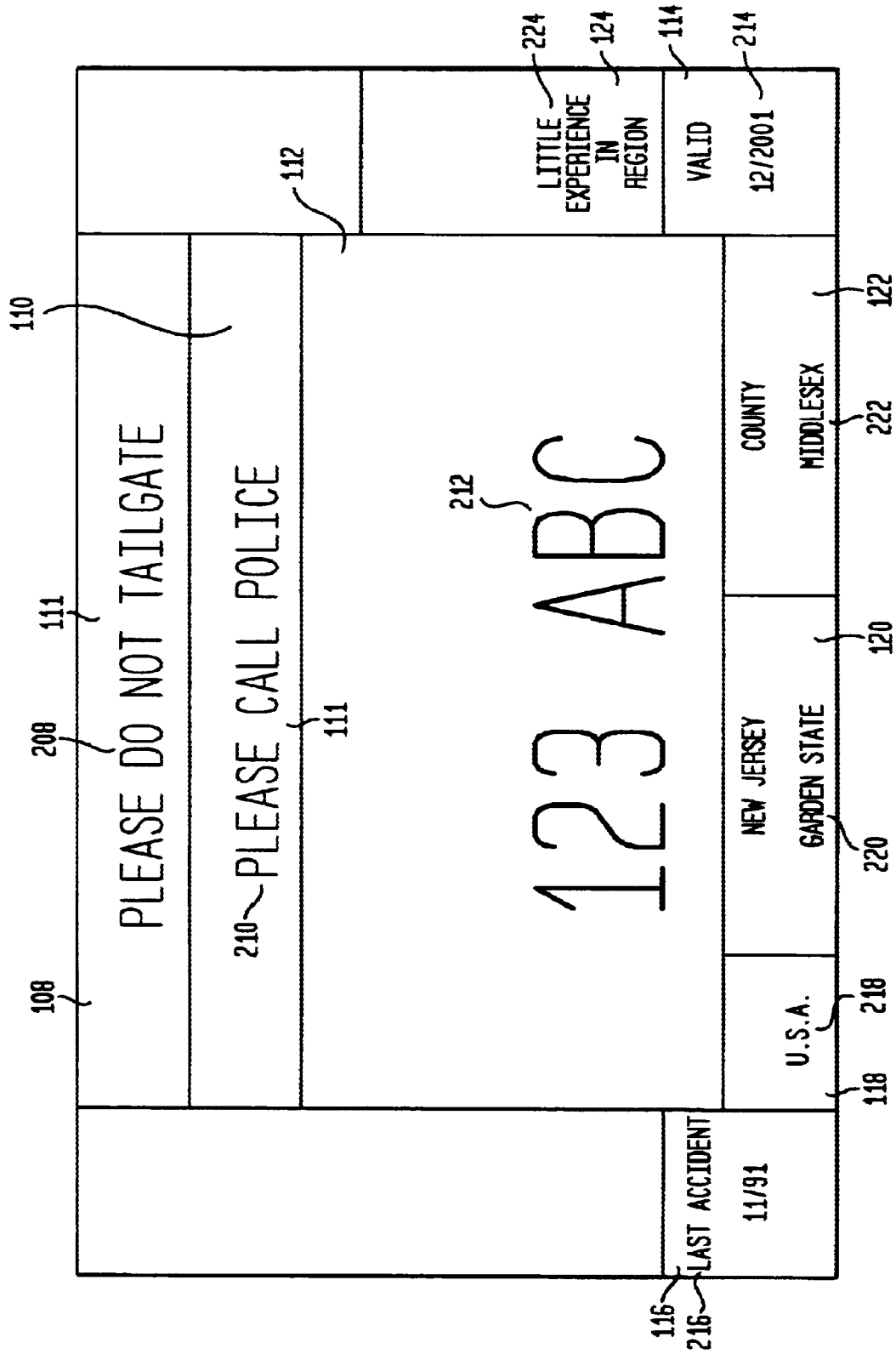
FIG. 2 is a schematic view of the Smart Vehicle Registration Plate of FIG. 1, showing exemplary messages in the dynamic display regions.

Referring to FIG. 2, the Smart Vehicle Registration Plate is shown with exemplary messages 111 being displayed in various information display regions 107. A sample registration number 212 is shown displayed in registration number region 112. The registration number is analogous to the common license plate number on vehicle registration plates. The vehicle registration number may be changeable or updated by personnel at the Department of Motor Vehicles (DMV) or other appropriate government agency. In an exemplary embodiment, this field would normally not be updateable by the driver or owner of the vehicle, since only government officials should be able to change this information, regarding to legal status. Since this region is dynamically updateable, the number may be easily changed if there is a need for changing a registration number, such as if a vehicle changes ownership or if a vehicle owner decides to purchase a customized registration number. The number may be easily modified or changed by personnel from the DMV without the need for removing a license or registration plate and then replacing it with a new license plate. Further, the ability to dynamically update the registration number 212 eliminates the need to manufacture and create a new license plate each time a new registration number is required.

The state identifier region 120 is shown displaying a sample state identifier 220. As with the registration number region, the state identifier region should only be modifiable by personnel from the DMV or appropriate government agency and may be dynamically modified as necessitated if the vehicle is registered in a different state.

In a similar fashion, county identifier region 122 is shown displaying sample county information 222. Similarly, country identifier region 118 is shown displaying sample country identifier information 218.

While the Smart Vehicle Registration Plate 100 is shown being registered in the United States, the Smart Vehicle Registration Plate 100 of the present invention may be used in other countries as well. If a vehicle is registered in a foreign country, the state identifier region 120 and county identifier region 122 may be used to designate similar districts in the foreign country, as need be, such as, for example, Provinces (Canada) or Cantons (Switzerland).

Expiration date region 114 is shown displaying sample expiration date information 214. The expiration date of the registration is often displayed on adhesive decals or stickers affixed to the windshield of a vehicle. Upon renewing of registration and/or completion of the mechanical inspection of a vehicle, the sticker is usually removed from the windshield by scraping and then a replacement sticker with this new registration expiration date is affixed to the windshield. By providing expiration date information 214 in expiration date region 114, the police and other concerned parties can easily determine the expiration date of the registration of the vehicle. Since expiration date region 114 may be illuminated, this information may be discerned during evening and other darkness hours. In this way, information that cannot normally be seen on the adhesive sticker on a windshield in the evening may be readily determined by viewing the Smart Vehicle Registration Plate. Also, since the Smart Vehicle Registration Plate obviates the need for a sticker to be placed on the windshield, a driver's field of vision through the windshield may be increased. Further, while removal of an expired sticker and replacement of the expired sticker with a new sticker requires a time-consuming, messy and tedious manual process, the expiration date region 144 of Smart Vehicle Registration Plate 100 may be readily updated. The manner in which these regions may be updated is discussed further below.

Last accident/violation region 116 is shown with sample last accident date message 216. This display field is used to show when the driver last was in an accident or had a motor vehicle violation. Passengers in surrounding vehicles can view this information and better assess their driving tactics to drive more safely if, for example, a person has had a recent accident or a large number of recent accidents or violations. Similarly, police officers, debating whether to pull a vehicle over in a borderline case, may use this information to more properly gauge whether to pull a driver over for questioning and further information gathering.

Referring once again to FIG. 2, emergency message region 110 is shown with sample emergency message 210. The emergency message 210 may be entered by the driver and could alert police or other motorists or pedestrians of a critical situation and allow those persons to get help more quickly. The message might be selected from a number of pre-stored messages or entered in as a customized message from the vehicle operator. As an alternative, a message may be triggered by an event such as the inflation of and airbag, the automobile hitting an object, decelerating quickly, or experiencing high temperatures or other physical phenomena indicative of an emergency situation. Sensors within the vehicle may be linked to the computing unit of the Smart Vehicle Registration Plate, thus triggering the appropriate emergency message. Examples of emergency messages that may be displayed include, but are not limited to, "Please call the police", and "Bleeding, please call an ambulance." Besides sensors sensing physical phenomena related to the vehicle, sensors may also be used to sense vital characteristics of the driver such as pulse rate, temperature, or other biometric data. In this manner, the display of emergency messages 210 may be triggered by changes in the vital characteristics of the driver. For example, if the driver were to have a heart attack, an emergency message stating the status of the driver, and requesting assistance, could be generated.

Personal message region 108 is shown with sample personal message 208. As with the emergency message 210, the personal message may also be entered by the driver of the vehicle. As with the emergency messages, a personal message may be custom entered by the vehicle driver or owner, or, in the alternative, may be selected from a preprogrammed and saved list of optional messages. Personal messages may include, but are not limited to, "Do not tailgate" and "Doctor of Internal Medicine." For messages of the custom entered type, filtering units may be embedded in the computing unit in order to block output of certain phrases or words that may be deemed inappropriate, such as, for example, those containing profanity.

With respect to the personal message region 108, as well as the other information display regions 107, if a message contains too many characters, or is otherwise too long to be displayed on the Smart Vehicle Registration Plate 100 all at one time, the Smart Vehicle Registration Plate 100 may be configured to facilitate the scrolling of messages or alternating between different words or phrases of a message. By the use of scrolling, or alternately displaying different phrases or parts of messages, messages longer than those that may be displayed fully at one time may be displayed by the Smart Vehicle Registration Plate 100.

Figure 3:
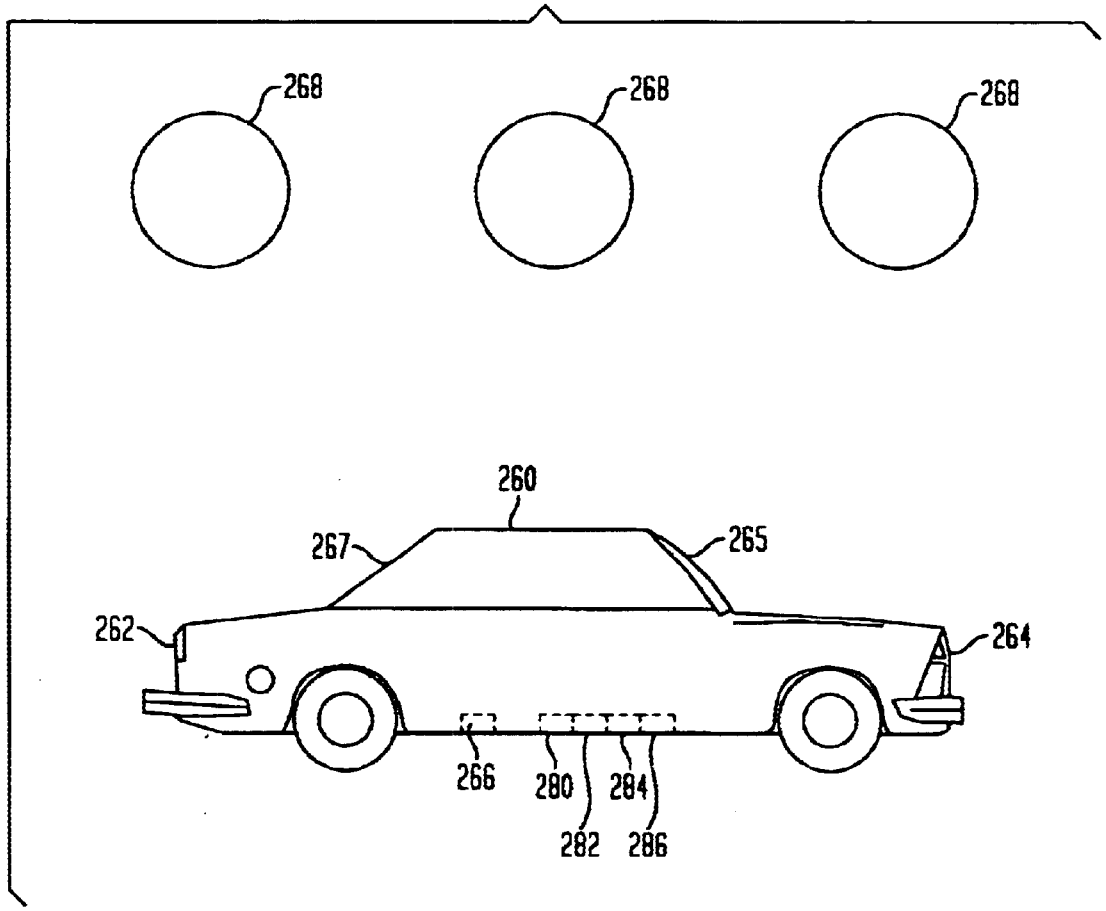
FIG. 3 is a schematic view of a vehicle having the Smart Vehicle Registration Plate of the present invention.

FIG. 3 shows a vehicle 260 having Smart Vehicle Registration Plate 100. While vehicle 260 is depicted as an automobile, Smart Vehicle Registration Plate 100 may be used on a variety of vehicles such as, but not limited to, automobiles, small trucks, commercial trucks, boats, buses, motorcycles and any other vehicles that may benefit from the dynamic display of important information. Smart Vehicle Registration Plate 100 may be located at rear location 262 or front location 264 of the vehicle 260. Alternatively, Smart Vehicle Registration Plate 100 may be situated at other locations on vehicle 260 such as front windshield location 265, rear windshield location 267, or any other location where other motorists, pedestrians or law enforcement officials would be able to easily see the information displayed on the Smart Vehicle Registration Plate. A Global Positioning System (GPS) processor, or system 266 of any known or hereafter developed type, may be mounted anywhere on vehicle 260. In an exemplary embodiment, GPS processor 266 may be integrally located within housing 102 of Smart Vehicle Registration Plate 100. GPS processor 266, used in tandem with GPS 268 may be used to obtain the current vehicle position location of vehicle 260. The computing unit 109, having stored home identifier information for the vehicle's registered region can compare the current location of vehicle 260 with the registration region and determine if the driver is in a driving area with which he or she is familiar. Further, data may be stored regarding the amount of time spent in different regions and a cumulative total could be displayed. Other vehicle position processing known in the art or that will become known can also be carried out using the teachings of the instant invention.

Turning now to FIGS. 1 and 2, "experience in area" region 124 is shown with sample experience in area identifier 224. By use of a GPS location system, experience in area identifier 224 may be dynamically updated based on the current position of the vehicle and the driver. In order to link this information to the personal information of the driver, the driver's driving license number may be entered into a data entry port in the vehicle, discussed below, and the home information on the vehicle driver's license may be used if the driver of the vehicle is not the owner of the vehicle. Alternatively, other information, such as a driver's social security number, or other number pertaining to the driver, may be used. Entry of this information is not necessary if the driver of the vehicle is also the owner, or standard user of the vehicle, in which case, the appropriate information regarding the driver may already be stored within computing unit 109 of Smart Vehicle Registration Plate 100.

Figure 4:
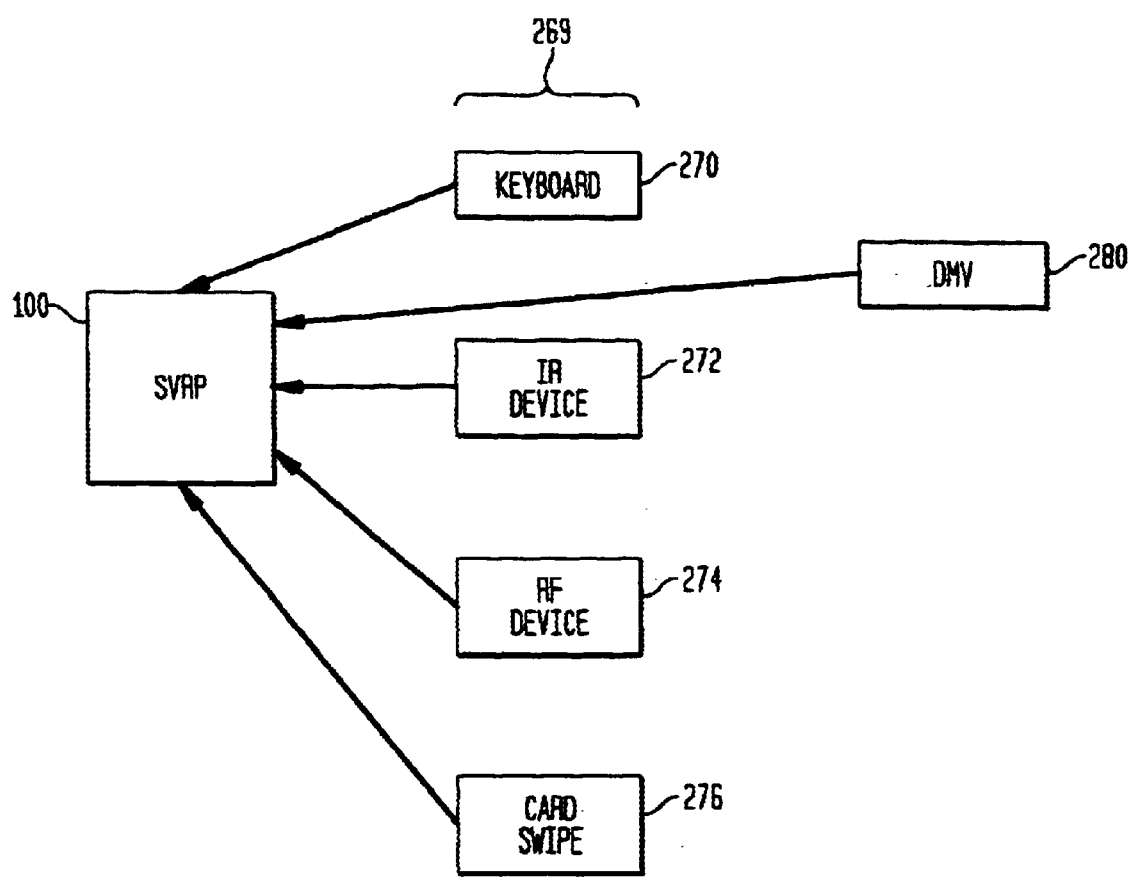
FIG. 4 is a block diagram depicting various user interfaces in accordance with the present invention.

As shown in FIG. 4, data may be dynamically entered into Smart Vehicle Registration Plate 100 by various user interface units 269, which communicate with plate 100 over any of a variety of media, and in any known format, as a matter of application specific design choice. User interface units 269 may include, but are not limited to, a keyboard 270, an Infrared (IR) unit 272, a Radio Frequency (RF) unit 274 and a card swipe unit 276. These user interface units may be located within the vehicle or outside the vehicle and may be in the form of a permanently affixed unit or, alternatively, a portable hand-held unit. Additionally, a user interface unit may be mounted on an external surface of a vehicle. In an exemplary embodiment, user interface units 269 may include a speech recognition system that could convert a user's voice commands into text, then filter the text for profanity, unwanted phrases, incorrect grammar, etc., and then facilitate the display of a message on Smart Vehicle Registration Plate 100. In another exemplary embodiment, a keyboard user interface unit 270 may be placed in a vehicle such that the vehicle driver may enter information to be displayed, such as a personal message 208 or emergency message 210. A card swipe unit 276 or IR unit 272 may be used by personnel at the motor vehicle department in order to update information during registration or inspection of the vehicle. As mentioned above, use of the Smart Vehicle Registration Plate 100 and user interface 276 frees DMV personnel from the manual task of scraping decals from windows, and applying replacement decals, thus saving both time and effort.

Referring to FIG. 5, the receiver and transmit operations of the Smart Vehicle Registration Plate are shown. First, in an exemplary embodiment, the operator of the vehicle may choose whether the transmitting of information will be via automatic mode, or manual mode. The operator of the vehicle may choose between manual mode or automatic mode (as is shown in step 300) via a selector switch, push-button, voice activation, or by any of the previously described user interface units 269 (see FIG. 4). Returning to FIG. 5, if automatic mode is selected, the Smart Vehicle Registration Plate may check the vehicle status to determine if an accident has occurred (as is shown in step 302). As described above with respect to the triggering of emergency messages, an accident may be detected by an event, such as the inflation of an airbag, the vehicle hitting an object, decelerating quickly, or experiencing high temperatures or other physical phenomena indicative of an emergency situation. If no accident is detected, the Smart Vehicle Registration Plate may continue to wait for an accident to occur.

A receiving unit 280, transmitting unit 282, storage unit 284 and communication unit 286 may be disposed on or within vehicle 260 (see FIG. 3). Receiving unit 280, transmitting unit 282, storage unit 284 and communication unit 286 may be disposed internal or external to housing 102.

Returning to FIG. 5, if a vehicle is involved in an accident, but only to a minor degree where the receiver and transmit mode are not automatically triggered by the physical phenomena related to the accident, the drive of the vehicle may enable the transmit mode by selecting manual operation (as shown in step 300). Alternatively, the manual mode may trigger the receiver mode, or both the receiver and transmit modes.

If an accident is detected, receiving unit 280 may be enabled (as is shown in step 304). Receiving unit 280 may allow the Smart Vehicle Registration Plate to receive information that is transmit from other Smart Vehicle Registration Plates on other vehicles that may have also been involved in the accident. Receiving unit 280 may continue to receive information for a set amount of time (as is shown in step 306). If the set amount of time, or time delay, is not complete, the Smart Vehicle Registration Plate may continue to receive information from other Smart Vehicle Registration Plates (as is shown in step 308). Once the time delay is completed, the received information may be saved to a storage unit 284 (as is shown in step 316). Storage unit 284 may be a Ready Access Memory (RAM), hard drive, other magnetic medium, or other storage unit known to those skilled in the art, the specific type of memory selected being a matter of application specific design choice.

Also, once an accident is detected, in parallel with the receiving of information, the Smart Vehicle Registration Plate may also transmit information, by way of transmitting unit 282, pertaining to the driver and the vehicle, to Smart Vehicle Registration Plates of the other vehicles involved in the accident (as is shown in step 310). As with the receiving of information discussed above, the transmitting of information by the Smart Vehicle Registration Plate may have a time delay associated with it (as is shown in step 312). This time delay may be for the same duration as, longer than, or shorter than the time delay corresponding to the receiving of information, as may be determined based on application specific factors. If the time delay for transmitting has not elapsed, the Smart Vehicle Registration Plate may continue to transmit information (as is shown in step 314). Once this time delay has elapsed, however, pertinent information may be saved to storage unit 284, as is discussed above, and shown in step 316.

After the information is saved to storage unit 284, the information may then be communicated, by way of communication unit 286, to another location (as is shown in step 318), such as, for example, the DMV 280 (see FIG. 4), the police, or the relevant insurance companies.

In this manner, information regarding the drivers and vehicles involved in the accident, as well as pertinent insurance information, may by easily and automatically exchanged between drivers of vehicles who are involved in an accident. This allows drivers to avoid the step, for example, where, after an accident, information regarding driver license and insurance information is exchanged between drivers involved in an accident. Further, besides driver license and insurance information, other information regarding an accident, such as the speeds of the involved vehicles, the relative locations of the vehicles (the vehicle position being calculated via GPS as described above), and other information regarding the accident may be exchanged among Smart Vehicle Registration Plates, and ultimately communicated to the DMV, the police, or insurance companies. Accordingly, pertinent information may be exchanged automatically, between the vehicles involved in an accident, quickly and efficiently, without the introduction of human error.

The transmit and receiving units 280, 282 for exchanging information between vehicles may be located within the housing of the Smart Vehicle Registration Plate, or alternatively, may be disposed elsewhere within the interior or exterior of the vehicle. The transmit may be by Radio Frequency (RF), infrared (IR), cellular, or other communication method known in the art and is a matter of application specific design choice. In an exemplary embodiment, the signal strength of the information transmit may be limited such that only vehicles in a limited region about the accident scene can receive another vehicle's information. In this manner, the airwaves are not needlessly cluttered with extraneous signals.

The communication, via communication unit 286, of the saved information to the DMV, police, insurance companies, or other entities may be from a unit, as is known in the art, located either within the housing of the Smart Vehicle Registration Plate, or alternatively, elsewhere on or in the vehicle. As with the transmit of information from Smart Vehicle Registration Plate to Smart Vehicle Registration Plate, the communication of saved information to the DMV or other entity may be by Radio Frequency (RF) or other communication method known in the art and is a matter of application specific design choice. This information may include a combination of information regarding all of the drivers and vehicles involved in the accident. In an exemplary embodiment, a specific channel or frequency may be designated by the Federal Communications Commission (FCC) or other authoritative body for the transfer of this type of information One skilled in the art will recognize from the teachings herein that, while the Smart Vehicle Registration Plate has been described herein as being substantially the same size and shape as a standard registration or license plate, the Smart Vehicle Registration Plate may be larger in size, allowing for larger display text, or more display regions, or smaller in size. Further, housing 102 need not be rectangular in shape, but may be formed in a variety of shapes, in order to integrate advantageously with the physical characteristics of a particular vehicle.

Moreover, one skilled in the art will also recognize from the teachings herein that the various components of Smart Vehicle Registration Plate 100, such as display 104, computing unit 109, user interface unit 269, and GPS processor 266 may be integrated into a single package, or alternatively, separate components may be distributed throughout the vehicle to advantageously make use of available space within, and external to, the vehicle.

Further, while the Smart Vehicle Registration Plate has been described as replacing a traditional license, or registration plate, one skilled in the art will appreciate that the Smart Vehicle Registration Plate of the present invention may also be used in conjunction with a traditional registration plate, in order to augment already available information to be displayed.

Thus, while there have been shown and described and pointed out fundamental novel features of the invention as applied to exemplary embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A smart vehicle registration plate adapted for visible mounting to a vehicle comprising:

a computing unit having a first user interface arranged for access by a user of said vehicle and a second user interface arranged exclusively for access by a vehicle regulatory authority, said computing unit being configured to process vehicle related information; and a display having one or more information display regions for displaying said processed vehicle related information, said information display regions displaying said processed vehicle related information under the control of said computing unit so as to be visible from a vantage point external to the vehicle.

2. The smart vehicle registration plate of claim 1, further comprising:

a housing adapted for mounting to a vehicle registration plate receiving portion of the vehicle.

3. The smart vehicle registration plate of claim 2, wherein said computing unit is disposed within said housing.

4. The smart vehicle registration plate of claim 1, further comprising:

a GPS receiver system for obtaining vehicle position information and communicating said information to said computing unit.

5. The smart vehicle registration plate of claim 4, wherein one or more of said information display regions are adapted to display information that is updated as a function of said vehicle position information.

6. The smart vehicle registration plate of claim 4, wherein said information display regions include an experience in area region, said experience in area region being under the control of said computing unit as a function of said vehicle position information.

7. The smart vehicle registration plate of claim 1, further comprising:

a receiving unit adapted to receive information from at least one other vehicle, said receiving unit being coupled to said computing unit.

8. The smart vehicle registration plate of claim 1, further comprising:

a transmitting unit adapted to transmit information to at least one other vehicle, said transmitting unit being coupled to said computing unit.

9. The smart vehicle registration plate of claim 1, further comprising:

a storage unit adapted to save information related to a vehicle-related event, said storage unit being coupled to said computing unit.

10. The smart vehicle registration plate of claim 9, wherein said vehicle-related event is an accident.

11. The smart vehicle registration plate of claim 9, further comprising:

a communication unit adapted to communicate said saved information to a third party entity.

12. The smart vehicle registration plate of claim 1, wherein said one or more information display regions include a registration number region.

13. The smart vehicle registration plate of claim 1, wherein said one or more information display regions include an expiration date region.

14. The smart vehicle registration plate of claim 1, wherein said one or more information display regions include a state identifier region.

15. The smart vehicle registration plate of claim 1, wherein said information display regions further include at least one from the set of regions consisting of:

an emergency message region;

a personal message region;

a country identifier region;

a county identifier region;

a last accident/violation region; and an experience in area region.

16. The smart vehicle registration plate of claim 1, further comprising a sensing unit for sensing biometric data related to the driver, said sensing unit being coupled to said computing unit, said computing unit being adapted to control said information display regions so that one or more of said information display regions displays information that is a function of said biometric data.

17. The smart vehicle registration plate of claim 1, wherein said vehicle related information is scrolled across at least one of said information display regions.

18. The smart vehicle registration plate of claim 1, wherein said first and said second user interfaces are chosen from the set of interfaces consisting of a keyboard, a card swipe input unit and a voice activated unit.

19. The smart vehicle registration plate of claim 18, wherein at least a portion of said user interface is disposed within a portion of an interior of said vehicle.

20. The smart vehicle registration plate of claim 18, wherein at least a portion of said user interface is disposed on an external surface of said vehicle.

21. The smart vehicle registration plate of claim 1, wherein said vehicle related information includes information related to a driver of said vehicle.

22. The smart vehicle registration plate of claim 1, wherein said computing unit is disposed proximate to said display.

23. The smart vehicle registration plate of claim 1, wherein said computing unit is wirelessly coupled to said display.

24. The smart vehicle registration plate of claim 1, wherein said processed vehicle related information comprises information related to whether or not the vehicle has been stolen.

25. A method of displaying vehicle related information external to a vehicle, said method comprising the steps of processing vehicle related information by a computing device, said computing device having a first user interface arranged for access by a user of said vehicle and a second user interface arranged exclusively for access by a vehicle regulatory authority; and displaying said processed vehicle related information at a display device associated with said vehicle under the control of said computing unit.

26. The method of claim 25, further comprising:

receiving at said computing unit vehicle position information for said vehicle from a GPS receiver system; and updating said display device by said computing unit as a function of said received vehicle position information.

27. A smart vehicle registration plate adapted for visible mounting to a vehicle comprising:

a computing unit configured to process vehicle related information, said computer unit including a user interface disposed at said vehicle; and a display having one or more information display regions for displaying said processed vehicle related information, said information display regions displaying said processed vehicle related information under the control of said computing unit so as to be visible from a vantage point external to the vehicle;

wherein said user interface is operative to provide dynamic control of at least a portion of said display regions for a user of said vehicle.

* * * * *